Feb. 16, 1926.

A. A. RESSEGUIE

PLANTER DEPTH GAUGE

Filed August 17, 1925

1,573,327

Inventor—
Alba A. Resseguie
By Davis Freeman & Latty Attys

Patented Feb. 16, 1926.

1,573,327

UNITED STATES PATENT OFFICE.

ALBA A. RESSEGUIE, OF TERRIL, IOWA.

PLANTER DEPTH GAUGE.

Application filed August 17, 1925. Serial No. 50,583.

*To all whom it may concern:*

Be it known that I, ALBA A. RESSEGUIE, a citizen of the United States, and a resident of Terril, in the county of Dickinson and State of Iowa, have invented certain new and useful Improvements in a Planter Depth Gauge, of which the following is a specification.

My invention relates to a planter depth gauge, and it is my object to provide such a gauge which is of extremely simple, durable and inexpensive construction.

More specifically, it is my object to provide a depth gauge comprising a pair of runners adapted to straddle the planter shoe, the gauge being so constructed that the runners may be formed integrally with each other and with means for securing one end of the gauge to the planter shoe.

A further object is to provide a gauge of such construction that it may be attached very readily to the ordinary type of planter having a projecting foot to which the planter shoe is attached by means of a bolt, and having a pair of ears formed on the planter leg to which a transverse frame member is attached, without alteration of any of the planter parts or drilling therein.

Another object is to provide a gauge which will not clog with weeds and débris, and which is constructed so as to repel any stalks or weeds which may come in contact therewith.

A still further object is to provide a depth gauge having a simple means allowing adjustability in vertical and longitudinal directions, and which is readily adaptable to planters of varying dimensions.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Figure 1:
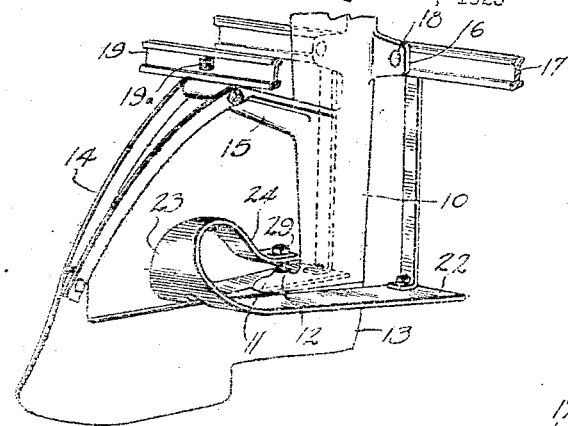
Fig. 1 is a perspective view of a portion of a planter leg and shoe of a common type, with my improved gauge attached thereto.

In most forms of planters the planting mechanism proper includes a depending leg or shaft, 10, which may be hollow to provide a passage for the seeds, and which has at its lower end a forwardly projecting foot, 11, having a boss, 12, through which is received a bolt serving to secure to the foot the rear end of the planter shoe, 13. The forward end of the shoe, 13, may be braced from the leg, 10, or from another portion of the planter, and in the particular type shown is supported by a pair of arms, 14, secured at their upper ends to a bracket, 15, formed integrally with the leg, 10.

A pair of ears, 16, are formed on the planter leg, 10, above the bracket, 15, and serve to secure the leg to a transverse frame member, 17, by means of bolts, 18.

A forward frame member, 19, is secured by means of bolts, 19ª, to the bracket, 15, at its forward end, and extends parallel to the frame member, 17.

I am aware that planter depth gauges have been devised, most of which clamp to the planter shoe by embracing the sides thereof. Such devices have the disadvantage of lacking an absolutely positive connection with the planter shoe, and further being awkward to adjust.

In addition, where two separate side pieces are used, the forward piece or ends of the same are likely to catch débris and clog the planter shoe.

In my invention the gauge is formed of a sheet of heavy steel, or the like, which is shaped to provide the diverging runners, 21, spaced by a slot, 22, and merging at their forward ends into a common breast portion, 23, which is curved upwardly, as illustrated. The breat portion, 23, is thence curved rearwardly and merges into a neck portion, 24, which is curved downwardly and thence rearwardly, substantially parallel to the runners, 21, as at 25.

In the horizontal portion, 25 of the neck, 24, is an elongated slot, 26, which receives a stud bolt, 27, inserted in the boss, 12, in place of the bolt normally used to secure the same to the shoe, 13.

On the stud, 27, are threaded a pair of nuts, 28 and 29, below and above the neck portion, 25, respectively.

The guage when attached to the planter is positioned with the planter shoe, 13, received in the slot, 22, the arm, 21, embracing the planter shoe and leg.

A pair of arms, 30, are provided to support the rear ends of the runners, 21, and are slotted, as at 31, at their upper ends to receive the bolts, 18, of the planter frame. At their lower ends the arms, 30, are bent at right angles, as at 32, and drilled to receive bolts, 33, securing the arms, 30, to the runners, 21.

By loosening the nuts of the bolts, 18, and sliding the arms upwardly, and by loosening the nut, 29, and threading the nut, 28, upwardly, the guage may be raised. A reverse operation serves to lower the runners.

The runner may be adjusted forwardly and rearwardly by sliding the neck portion, 25, relative to the stud, 27, the slot, 26, allowing such sliding.

Figure 2:
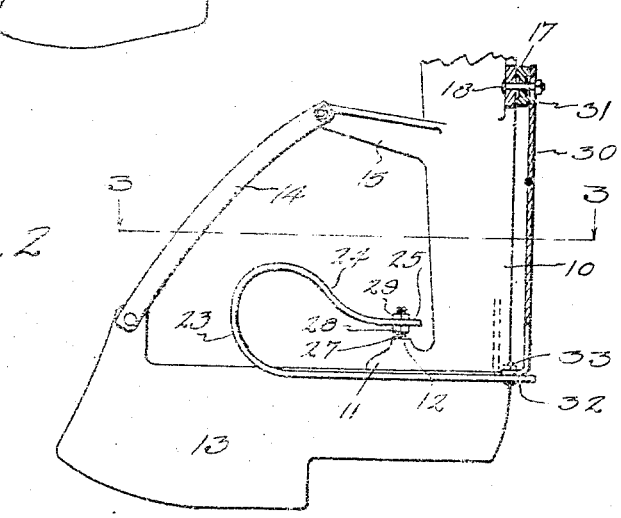
Fig. 2 is a side elevation of the same, parts being shown in section to better illustrate the construction.
Figure 3:
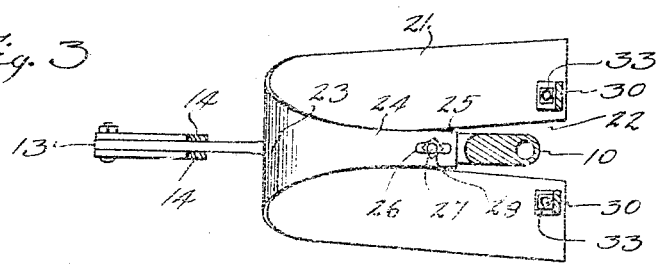
Fig. 3 is a horizontal sectional view, taken on the line 3—3 of Fig. 2.

By tightening the nuts, 28 and 29, against the neck portion, 25, the runner may be secured in such adjusted position. When so adjusting the guage, the resiliency of the arms, 30, takes care of the longitudinal movement of the runners at their rear ends.

Where the distance between the frame member, 17, and the stud, 27, is considerably less than that shown in the drawings, the arms, 30, may be simply rotated around the bolt, 33, as a pivot to the dotted line position indicated in Fig. 2. This will save undue bending of the arms, 30, and consequently will preserve the easy adjustability of the upper ends of the arms.

By securing the guage to the planter shoe rearwardly of the arms, 14, the débris, weeds, stalks, etc., will be parted by the planter shoe, and any stalk which may strike against the gauge will be deflected laterally by the rearwardly diverging edges of the breast portion, 23. The loop in the breast plate, 23, provides a downwardly and rearwardly inclined portion which causes the runners to ride over clods and the like smoothly without interfering with the motion of the planter. At the same time the loop allows the fastening of the guage to the stud, 27.

With the use of the positive adjusting means, including the stud, 27, and the slotted connection of the arms, 30, the runners may be readily adjusted through a slight variation of position so as to procure the exact depth desired for the dropping of seed.

For the particular form of planter shown, the neck, 24, might be extended upwardly between the arms, 14, and secured to the bolt, 19ª. However, such a construction would not be applicable to many forms of planters, and the construction shown is therefore thought to be superior.

I find that with the use of my depth gauge the rows may be planted to such a uniform depth that the stalks will appear at the same time and will grow uniformly during the early stages of growth.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A planter depth gauge to be attached to a planter having a planter leg secured by means of laterally spaced bolts to a transverse planter frame member, and having a planter foot extending forwardly from the lower end of the planter leg and having a planter shoe adapted to be secured to the leg by means of a bolt extending through said foot; said planter depth gauge comprising a pair of runners spaced at their rear ends to embrace the planter shoe and integrally united at their forward ends in an upwardly curved breast portion, said breast portion having a rearwardly extending neck adapted to be secured to said second mentioned bolt, arms secured to said first mentioned bolts, and depending therefrom, the lower ends of said arms being secured to the runners.

2. A planter depth gauge to be attached to a planter having a planter leg secured by means of laterally spaced bolts to a transverse planter frame member, and having a planter foot extending forwardly from the lower end of the planter leg and having a planter shoe adapted to be secured to the leg by means of a bolt extending through said foot; said planter depth gauge comprising an integral gauge member having spaced runners adapted to embrace the planter shoe, and having a portion looped upwardly from said runners and thence rearwardly and adapted to be secured to said last mentioned bolt, and suspending means connecting the rear ends of the runners with said first mentioned bolts.

3. A planter depth gauge to be attached to a planter having a planter leg secured by means of laterally spaced bolts to a transverse planter frame member, and having a planter foot extending forwardly from the lower end of the planter leg, and having a planter shoe adapted to be secured to the leg by means of a bolt extending through said foot; said planter depth gauge comprising a pair of runners spaced to embrace said shoe, a pair of arms secured to said first mentioned bolts and depending therefrom, the lower ends of said arms being secured to said runners at their rear ends, and a member extending from the forward ends of the runners to a position where it is adapted to be attached to said second mentioned bolt.

4. A planter depth gauge to be used with a planter having a frame, a planter leg, a planter foot extending forwardly from the lower end thereof, and a planter shoe adapted to be secured to said leg by means of a bolt extending through said foot; said planter depth gauge comprising an integral gauge member having a pair of runners spaced to receive the planter shoe, said runners being united at their forward ends and having a portion looped upwardly and thence rearwardly, said rearwardly extending portion being slotted to receive said bolt and to allow longitudinal adjustment of the gauge member thereon, and means for supporting the rear ends of the runners from said frame.

5. A planter depth gauge to be used with a planter having a frame, a planter leg, a foot projecting forwardly from the lower end of said leg, and a planter shoe; said planter depth gauge comprising a stud secured in said planter foot and having a threaded portion extending upwardly therefrom, a pair of nuts threaded on said stud, a gauge member comprising a pair of runners spaced to receive the planter shoe and integrally united at their forward ends to provide an upwardly looped portion, said portion terminating in a rearwardly extending neck, having a longitudinal slot, said stud being received through said slot, said nuts engaging the neck of the gauge on either side thereof, and means for supporting the rear ends of the runners from the frame.

6. A planter depth gauge to be used with a planter having a frame, a planter leg, a foot projecting forwardly from the lower end of said leg, and a planter shoe; said planter depth gauge comprising a stud secured in said planter foot and having a threaded portion extending upwardly therefrom, a pair of nuts threaded on said stud, a gauge member comprising a pair of runners spaced to receive the planter shoe and integrally united at their forward ends to provide an upwardly looped portion, said portion terminating in a rearwardly extending neck, having a longitudinal slot in said stud being received through said slot, said nuts engaging the neck of the gauge on either side thereof, and means for supporting the rear ends of the runners from the frame, said means comprising a pair of vertical arms extending upwardly from the runners and secured at their upper ends to the frame, the lower ends of said arms being bent at right angle thereto and pivotally secured to the runners so as to allow pivotal adjustment of the arms.

Signed at Sioux City, in the county of Woodbury and State of Iowa, this 14th day of August, 1925.

ALBA A. RESSEGUIE.